United States Patent [19]

MacGillivray

[11] 4,275,686

[45] Jun. 30, 1981

[54] HORSE EXERCISER DRIVE MECHANISM

[76] Inventor: John A. MacGillivray, 14205 - 119th Northeast, Kirkland, Wash. 98033

[21] Appl. No.: 33,212

[22] Filed: Apr. 25, 1979

[51] Int. Cl.$^3$ .............................................. A01K 15/02
[52] U.S. Cl. ...................................... 119/29; 272/39
[58] Field of Search ....................... 119/29; 272/39, 40, 272/41

[56] References Cited

U.S. PATENT DOCUMENTS

| 2,969,768 | 1/1961 | Grant | 119/29 |
| 3,332,683 | 7/1967 | Rand | 272/69 X |
| 3,716,029 | 2/1973 | Pillsbury, Jr. | 119/29 |
| 3,815,551 | 6/1974 | Losaw | 272/29 X |

Primary Examiner—Gene Mancene
Assistant Examiner—Robert P. Swiatek
Attorney, Agent, or Firm—Robert W. Beach; Ward Brown; Douglas E. Winters

[57] ABSTRACT

A two-speed motor drives a shaft carrying the horse-leading radial arms of a rotary mechanical hot-walker for cooling out horses at a slow walk or exercising horses at a trot. Speed-reducing mechanism for the motor includes two open V-belt drives connecting a constant speed ratio gearbox between the motor drive shaft and the shaft carrying the hot-walker arms. One of the open V-belt drives includes a variable pitch pulley the operation of which, in combination with the two motor speeds, enables the rotative speed of the radial horse-leading arms to be at least almost infinitely adjustable throughout the entire wide range from a slow walking speed, when the motor is operating at its low speed, through a fast trotting speed, when the motor operating at its high speed. Belt tension adjusting mechanism is provided for the other open V-belt drive for adjusting the value of the maximum torque transferable by such other open V-belt drive at any rotative speed of the hot-walker rotor.

3 Claims, 3 Drawing Figures

HORSE EXERCISER DRIVE MECHANISM

BACKGROUND OF THE INVENTION

1. Field of the Invention

The present invention relates to rotary drive mechanism for a horse exerciser such as a hot-walker or a treadmill.

2. Prior Art

In a known radial arm rotary mechanical hot-walker, a two-speed motor rotates an upright shaft carrying the radially projecting arms to which horses are tethered, the object being to exercise horses at a trot when the motor is operating at its high speed and to cool out horses at a walk when the motor is operating at its low speed.

A problem with such a known hot-walker is that only either of two constant speeds may be selected. In practice, the optimum walking speed for cooling out horses until they stop sweating and relax varies from horse to horse. Similarly, the preferred exercising speed varies in accordance with the size and condition of a horse.

Another problem with such a known hot-walker is that on start-up a sharp jerk is applied to the horse which may cause the horse to shy and refuse to be led, resulting in damage to the hot-walker or injury to the horse.

Another problem with such a known hot-walker is that, for either operating speed, the maximum torque transferrable by the motor to the hot-walker shaft is constant, though horses react differently to different tensions applied to their lead straps.

Because of these problems, it is necessary to train horses to accept being cooled out or exercised by use of the known hot-walker. Until now, horses which were not well trained still had to be cooled out or exercised by an attendant.

SUMMARY OF THE INVENTION

The principal object of the present invention is to provide a drive mechanism for a horse exerciser, such as a hot-walker or a treadmill, enabling the exerciser to be used by horses varying widely in size, condition, temperament and training.

In accordance with the principal object, it is an object of such drive mechanism to be adjustable through a range of cool out speeds and exercising speeds and have mechanism for adjusting the maximum lead tension applied to a horse halter.

Another object is to provide economical mechanism which can provide a wide range of speed adjustment.

It is also an object to enable either an adjustable high speed range or an adjustable low speed range to be selected instantaneously.

The foregoing objects can be accomplished by providing horse exerciser drive mechanism including the combination of a two-speed motor having instantaneously selectable high and low speeds and variable speed ratio speed-reducing mechanism connected to the two-speed motor. Mechanism for adjusting the maximum output torque of the speed-reducing mechanism at any selected speed also can be provided.

In the preferred embodiment of the invention, the motor drive shaft is connected to the input shaft of a constant speed ratio gearbox by an open V-belt drive including a variable pitch pulley. The motor is swingable to swing its drive shaft for adjusting the tension of the V-belt, effecting a change in the effective diameter of the variable pitch pulley. The output shaft of the gearbox is connected to the exerciser drive shaft by another open V-belt drive and adjustment mechanism is provided for adjusting the tension of the V-belts of such other V-belt drive so that the V-belts will slip upon the occurrence of torque above a predetermined value.

DETAILED DESCRIPTION

Figure 1:
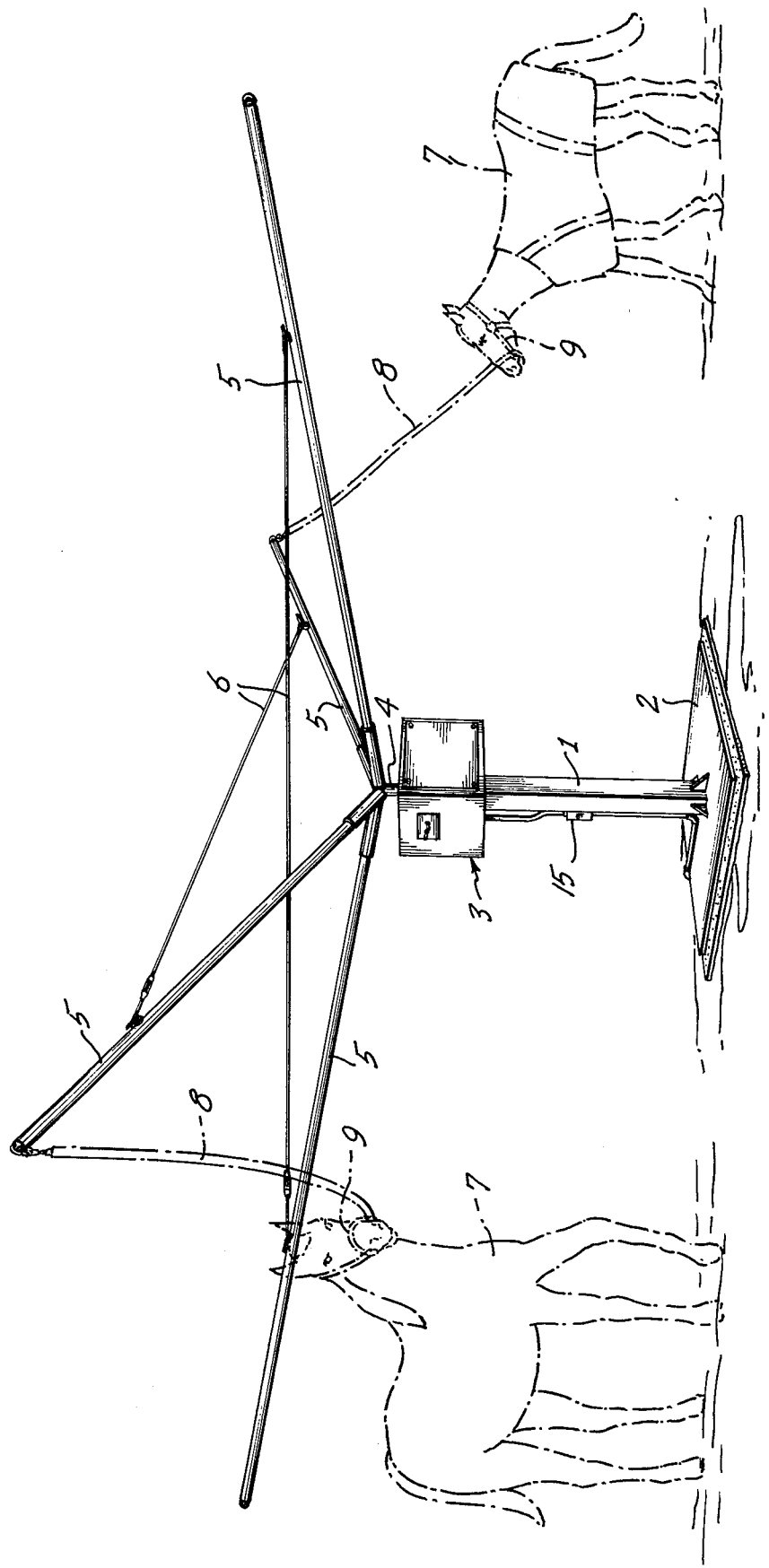
FIG. 1 is a somewhat diagrammatic two-point side perspective of a radial arm rotary mechanical hot-walker having drive mechanism in accordance with the present invention.

As shown in FIG. 1, in the preferred embodiment of the present invention a stationary pedestal 1, which may have its base 2 embedded in concrete, supports drive mechanism 3 for rotating an upright central shaft 4 from which arms 5 project generally radially. Four of such arms are mounted on shaft 4 with adjacent arms spaced angularly at 90° relative to each other. Each arm is inclined upward slightly from its inner end and oppositely projecting arms are connected by horizontal interconnecting ties 6 for support. In use, horses 7, or other animals, are tethered to the outer ends of the arms by lead straps 8 connected to their halters 9. Straps 8 tensioned by rotation of arms 5 lead the horses around in a circle for cooling out or exercising the horses.

Figure 2:
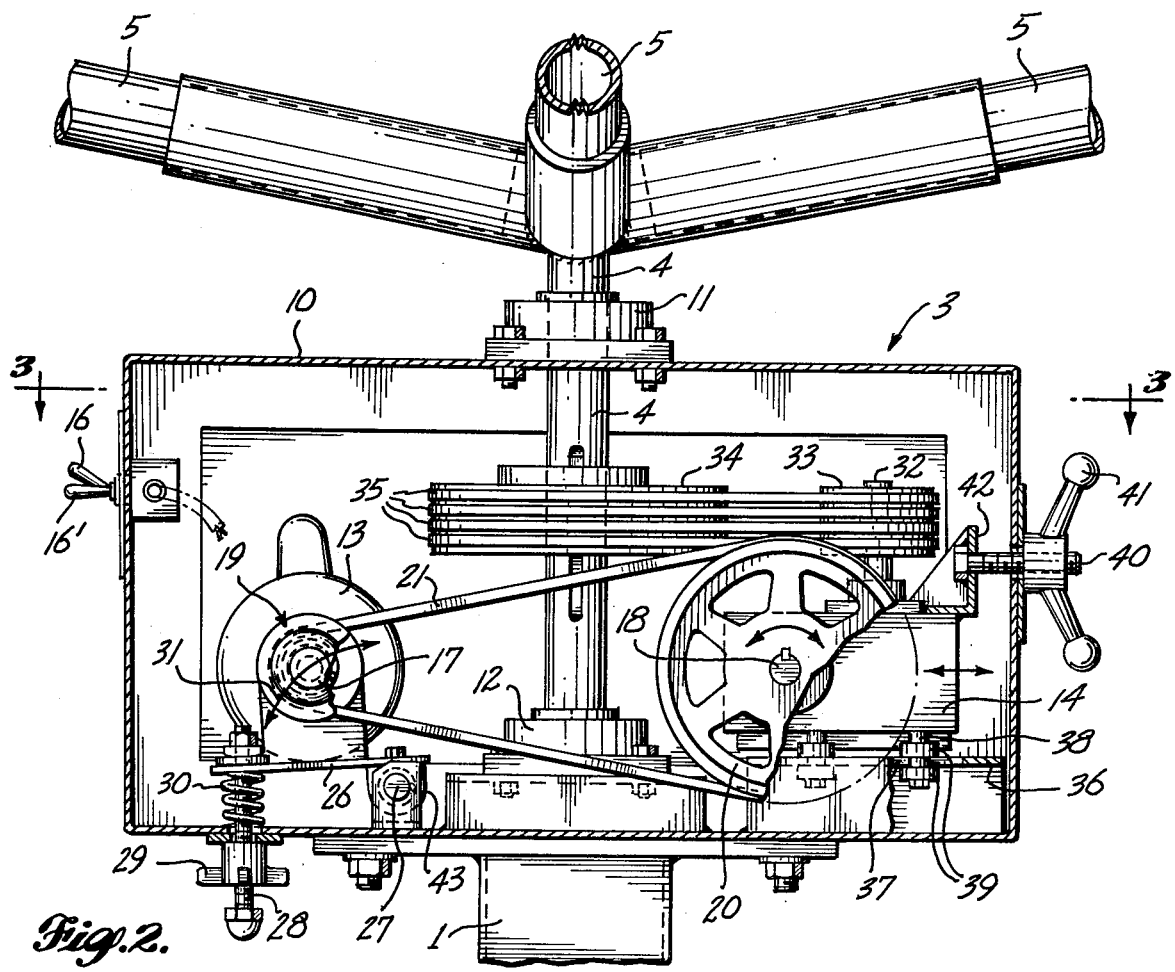
FIG. 2 is an enlarged fragmentary side elevation of the drive mechanism of FIG. 1 with parts shown in section and parts broken away.
Figure 3:
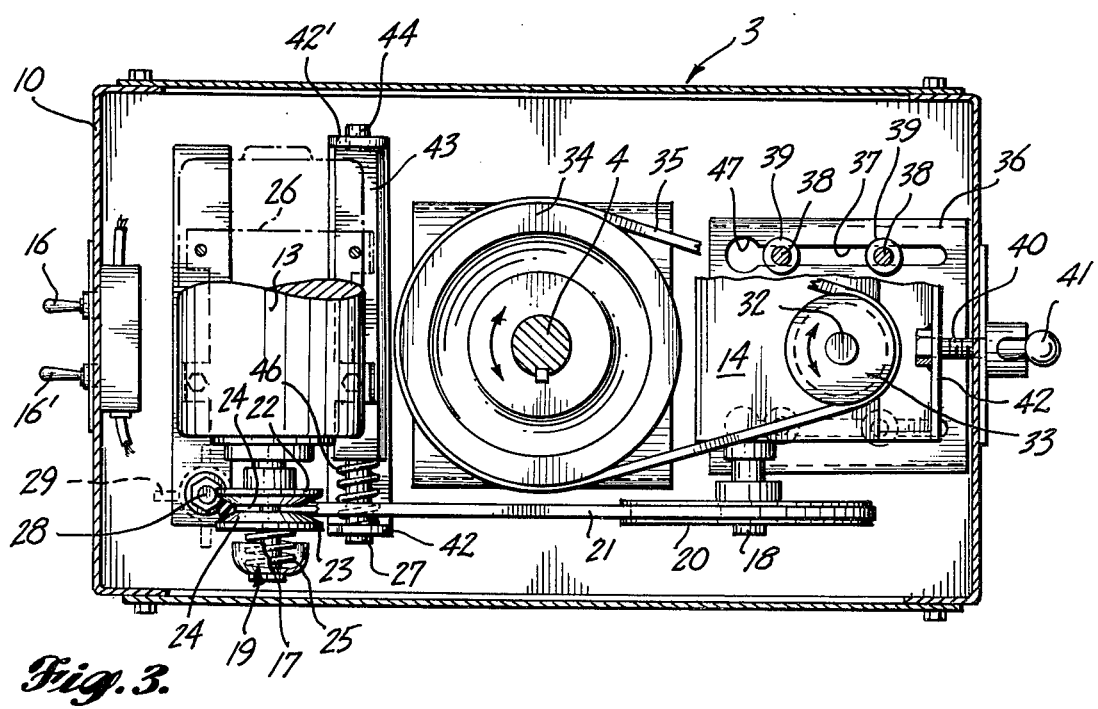
FIG. 3 is a section taken on line 3—3 of FIG. 2 with parts broken away.

As best seen in FIGS. 2 and 3, the drive mechanism 3 in accordance with the present invention is mounted in a rectangular housing 10 carried on pedestal 1. The hot-walker central shaft 4 extends vertically through the central portion of housing 10 and is journaled in bearings 11 and 12 mounted, respectively, on the housing top and bottom. In general, rotary power from a two-speed electric motor 13, mounted toward one end of the housing, is transferred to the hot-walker shaft 4 through a constant speed ratio speed-reducing gearbox 14, mounted toward the other end of the housing. An on-off switch 15 can be conveniently mounted on pedestal 1 below the housing 10 as shown in FIG. 1 for controlling the supply of electrical power to the motor. Manipulation of a speed control switch 16 effects rotation of the drive shaft 17 at either one of two substantially constant speeds. Another switch 16' controls the direction of rotation of the motor drive shaft so that the hot-walker horse-leading arms can be rotated either clockwise or counterclockwise for either motor speed.

The motor drive shaft 17 extends horizontally substantially parallel to the input shaft 18 of gearbox 14. Such two shafts are interconnected by an open V-belt drive including a motor drive pulley 19 mounted on the motor drive shaft, a gearbox input pulley 20 mounted on the gearbox input shaft and an endless V-belt 21 received in the grooves of the two pulleys. As best seen in FIG. 3, the motor drive pulley 19 is a variable pitch pulley including an inner pulley half 22 rigidly carried by the motor drive shaft and an outer pulley half 23 slidable toward and away from pulley half 22 for varying the width of the groove 24 formed therebetween. A helical compression spring 25 biases the outer pulley half 23 inward toward the stationary inner pulley half 22. Increasing the tension of V-belt 21 forces the belt downward into the pulley groove 24 which slides pulley half 23 outward such that the V-belt rests lower in the groove for reducing the effective diameter of the motor drive pulley 19. Correspondingly, if the tension of belt 21 is decreased, the force of spring 25 forces pulley half 23 inward relative to pulley half 22 causing belt 21 to ride higher in the pulley groove 24 which increases the effective diameter of the pulley.

For adjusting the tension of belt 21, the bottom mounting flange 26 of motor 13 is pivotally mounted on the housing bottom for swinging of the motor about the axis of a pivot shaft 27 extending horizontally below the motor and at the side of the motor closer to the hot-walker shaft 4. An upright bolt 28 carrying a threaded adjusting nut 29 outside the housing extends through registered holes in the housing bottom and the other side of the motor bottom mounting flange. A helical compression spring 30, encircling bolt 28 between the housing bottom and the motor bottom mounting flange, biases the motor upward away from the housing bottom.

Turning adjusting nut 29 clockwise for reducing the length of bolt 28 projecting inside the housing swings the motor downward, and also swings the motor drive shaft 17 arcuately away from the gearbox input shaft 18 along the arc 31 shown in FIG. 2 for increasing the tension of V-belt 21. Conversely, counterclockwise turning of adjusting nut 29 effects upward swinging of the motor by the force of spring 30, which swings the motor drive shaft 17 arcuately toward the pulley input shaft 18, decreasing the tension of V-belt 21. As discussed above, such V-belt tension adjustment changes the effective diameter of pulley 19 which correspondingly progressively changes the speed ratio of the open V-belt drive connecting the motor drive shaft 17 and the gearbox input shaft 18.

The gearbox output shaft 32 projects vertically upward from gearbox 14 substantially parallel to the hot-walker shaft 4 and is connected to the hot-walker shaft by another open V-belt drive including a multigroove gearbox output pulley 33 mounted on the gearbox output shaft 32, a multigroove hot-walker shaft pulley 34 mounted on the hot-walker shaft 4 and several endless V-belts 35 received in the grooves of the multigroove pulleys.

For adjusting the tension of belts 35, the gearbox is slidably mounted on the housing bottom by a gearbox mounting bracket 36 having slots 37 elongated longitudinally of the housing generally toward and away from the hot-walker shaft 4. Such slots receive pins 38 projecting downward from the gearbox and having collars 39 somewhat snugly embracing the margins of slots 37 above and below the slots. A horizontal bolt 40 carrying an adjusting nut 41 outside the housing extends through registered holes in an upright side of the housing and a flange 42 rigidly carried by the gearbox. Bolt 40 extends parallel to the length of slots 37 such that clockwise turning of adjusting nut 41 slides the gearbox longitudinally of the housing away from the hot-walker shaft 4 for tightening V-belts 35. Conversely, the tension of V-belts 35 slides the gearbox toward the hot-walker shaft when the adjusting nut 41 is turned counterclockwise, which loosens the belts.

Tension adjustment of belts 35 controls the value of the maximum torque transferable from the gearbox output shaft 32 to the hot-walker shaft 4; the tighter the belts the greater is the torque transferred by the belts before they slip on their pulleys.

The mountings of motor 13 and gearbox 14 to the housing enables quick and simple assembly and disassembly of the drive mechanism. As best seen in FIG. 3, one end portion of shaft 27 about which the motor can swing is received in the front end bracket 42 mounted on the housing bottom. Such shaft extends axially part way through the bore of a mounting sleeve 43 rigidly connected below the motor bottom mounting flange 26. Such sleeve has a circular lug 44 projecting from its end opposite the end receiving shaft 27 and normally received in the rear end bracket 42'. A helical compression spring 46, encircling pivot shaft 27 between front end bracket 42 and mounting sleeve 43, normally maintains lug 44 received in rear end bracket 42'. However, with the adjusting bolt 28 disconnected from the motor bottom mounting flange 26, the entire motor is slidable axially of shaft 27 against the biasing force of spring 25 for freeing lug 44 from the rear end bracket 42', whereupon the motor can be tilted and slid axially of shaft 27 toward rear end bracket 42' for removing the motor from the housing.

Gearbox 14 is quickly removable from the housing by disconnecting adjusting nut 41 from bolt 40 and sliding gearbox 14 inward toward the hot-walker shaft 4 until its supporting collars 39 are registered with holes 47 larger than the collars, whereupon the gearbox can be lifted upward out of the gearbox mounting bracket 36.

In the preferred form of the invention, varying the tension of V-belt 21 by turning adjusting nut 29 effects adjustment of the effective diameter or pitch of the motor drive pulley 19 between about 1.4 inches (3.6 cm) and about 2.9 inches (7.4 cm). The constant effective diameter of the gearbox input pulley 20 is about 6 inches (15.2 cm), resulting in the speed ratio of the rotative speed of the motor drive shaft 17 as compared to the rotative speed of the gearbox input shaft 18 being infinitely adjustable between about 2.1:1 and 4.3:1. The constant speed ratio of the gearbox, that is, the rotative speed of its input shaft as compared to the rotative speed of its output shaft 32, is about 48:1. The constant speed ratio of the open V-belt drive connecting the gearbox output shaft and the hot-walker central shaft 4, due to the effective diameters of pulleys 33 and 34 being different, is about 2.5:1. Consequently, the total speed reduction of the speed of the motor drive shaft as compared to the speed of the hot-walker shaft can be varied from about 250:1 to about 515:1.

Also in the preferred form of the invention, the rotative speed of the motor drive shaft is either about 1,100 rpm or about 1,750 rpm depending upon the position of switch 16. With the motor operating at its high speed a speed reduction of 250:1 results in rotation of the hot-walker shaft 4 and the horse leading arms 5 carried by such shaft at about 7 rpm. Such arms can be about 16 feet in length resulting in horses being led at a speed of about 7.9 miles per hour, a fast trot for most horses. By adjusting the tension of V-belt 21 by turning adjusting nut 29, the total speed reduction ratio is infinitely adjustable all the way up to about 515:1 which corresponds to a horse leading speed of about 3.9 miles per hour.

With the motor operating at its low speed, the maximum speed reduction ratio of 515:1 results in turning the horse walker shaft 4 and its horse leading arms 5 at about 2.1 rpm which gives a horse-leading speed of about 2.4 miles per hour, a slow walk for most horses.

As in the high speed range, the speed reduction ratio is infinitely adjustable down to about 250:1 which corresponds to a horse leading speed of about 5 miles per hour.

The two speed ranges overlap so that the horseleading speed of the outer ends of arms 5 is infinitely adjustable between about 2.4 miles per hour and about 7.9 miles per hour. Also, the hot-walker may be switched between its slow speed range and its high speed range, that is, between its cool out speed range and its exercising speed range, simply by manipulating the speed control switch 16 to select either the low speed or the high speed of motor 13.

The maximum lead tension that can be applied to a horse can be adjusted by adjusting the maximum output torque that can be transferred to the hot-walker shaft 4 by the open V-belt drive connecting the hot-walker shaft pulley 34 and the gearbox output shaft pulley 33. Such maximum output torque should be selected such that there is some slippage of belts 35 on their pulleys at start up to avoid applying an abrupt jerk to the horse. If the horse resists being led or stalls, slippage of belts 35 on their pulleys results in a steady pull being applied to the horse halter, the force of such steady pull corresponding to the maximum output torque transferrable, greatly lessening the chance that the horse will shy. In addition, if the horse stalls, there will be no injury to the drive mechanism because the motor output shaft is not rigidly connected to the hot-walker shaft, such as by gears or by a chain and sprocket drive.

By use of a horse exerciser drive mechanism in accordance with the present invention, the optimum exercising speed, the optimum cool out speed and the optimum maximum lead tension can be adjusted in accordance with the characteristics of a specific horse. While the drive mechanism has been described solely with reference to a hot-walker mounted on a stationary pedestal, such drive mechanism just as easily could be inverted and mounted on a ceiling. Also, such drive mechanism could be used to drive other types of exercisers, such as treadmills.

I claim:

1. In an exerciser including a rotatable member for inducing movement of an animal at a speed corresponding to the speed of rotation of such rotatable member and a motor having a rotary drive shaft for driving the rotatable member, the improvement comprising the motor being a selectively variable speed motor, motor control means for effecting rotation of the motor drive shaft at any selected one of a plurality of different predetermined speeds, variable speed ratio speed-reducing mechanism connected between the motor drive shaft and the rotatable member, said speed-reducing mechanism including an open V-belt drive having a variable pitch pulley, means mounting the motor for swinging to adjust the speed ratio of said speed-reducing mechanism by adjusting the tension of the V-belt of said open V-belt drive, and speed-reducing control means manipulatable to effect swinging of the motor while the motor is driving the rotatable member for adjusting the speed ratio of said speed-reducing mechanism in conjunction with different selected predetermined motor speeds.

2. In an exerciser including a rotatable member for inducing movement of an animal at a speed corresponding to the speed of rotation of such rotatable member and a motor having a rotary drive shaft for driving the rotatable member, the improvement comprising variable speed ratio speed-reducing mechanism connected between the motor drive shaft and the rotatable member, speed-reducing control means manipulatable while the motor is driving the rotatable member for adjusting the speed ratio of said speed-reducing mechanism, a constant speed ratio gearbox connected to said variable speed ratio speed-reducing mechanism, variable friction drive means connected between said constant speed ratio gearbox and the exerciser rotatable member, and drive torque adjusting means for adjusting said variable friction drive means for altering the maximum torque transferrable to the exerciser rotatable member from the motor drive shaft.

3. In the exerciser defined in claim 1, or 2, the speed ratio of the speed-reducing mechanism being infinitely adjustable through a predetermined range of speed ratios by manipulation of the speed-reducing control means so that, with the motor rotating its drive shaft at any of its substantially constant discrete speeds, the rotational speed of the rotatable member being infinitely adjustable through a predetermined range of speeds, and at least two of such rotatable member speed ranges overlapping.

* * * * *